United States Patent [19]

Pelz

[11] Patent Number: 5,016,934

[45] Date of Patent: May 21, 1991

[54] PREFABRICATED INNER ROOF LINING FOR MOTOR VEHICLES

[75] Inventor: Peter Pelz, Geretsried, Fed. Rep. of Germany

[73] Assignee: Ernst Pelz-Vertriebs GmbH & Co., Fed. Rep. of Germany

[21] Appl. No.: 516,768

[22] Filed: Apr. 30, 1990

[30] Foreign Application Priority Data

Nov. 2, 1988 [DE] Fed. Rep. of Germany ....... 3837171

[51] Int. Cl.$^5$ ................................................ B60J 7/00
[52] U.S. Cl. ..................................... 296/214; 296/37.8
[58] Field of Search ................................ 296/214, 210

[56] References Cited

U.S. PATENT DOCUMENTS 4,741,945  5/1988  Brant et al. ......................... 296/214
4,902,068  2/1990  Dowd et al. ......................... 296/214

FOREIGN PATENT DOCUMENTS 197802  7/1976  France .
2134464  8/1984  United Kingdom .

Primary Examiner—Robert R. Song
Attorney, Agent, or Firm—Hill, Van Santen, Steadman & Simpson

[57] ABSTRACT

A prefabricated inner roof lining for motor vehicles comprises interconnects, conductive layers or conductive networks in its surface and/or at its side facing away from the vehicle interior for supplying or distributing the electrical energy.

38 Claims, 6 Drawing Sheets

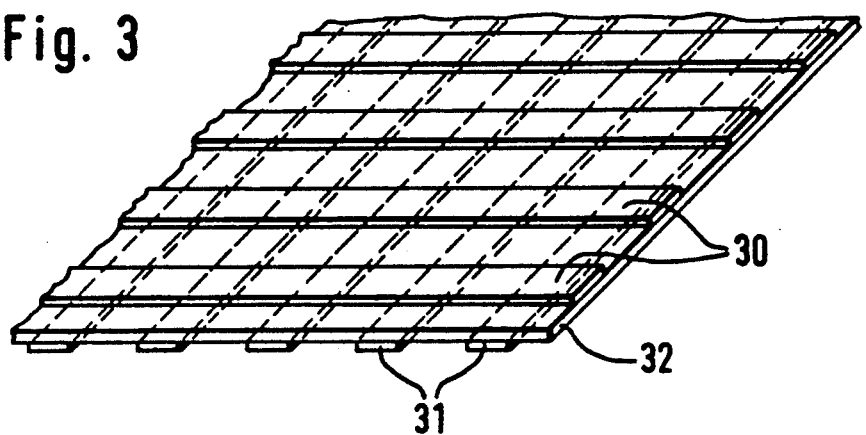
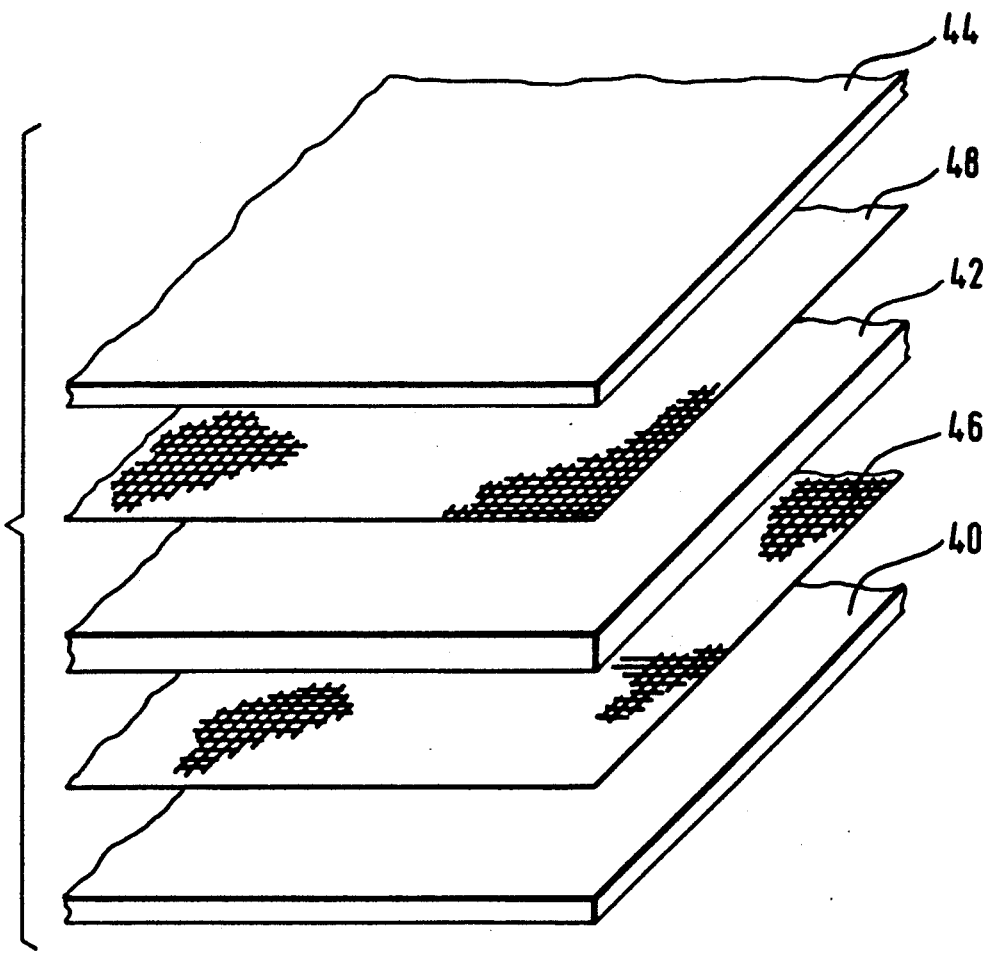

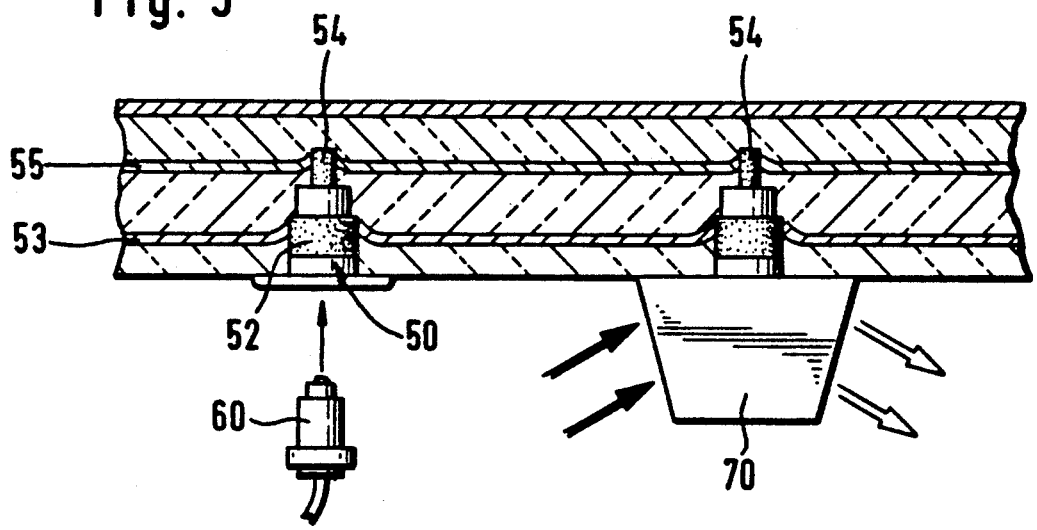

PREFABRICATED INNER ROOF LINING FOR MOTOR VEHICLES

BACKGROUND OF THE INVENTION

1. Field of the Invention

The present invention relates to inner roof linings for motor vehicles, and is particularly concerned with roof linings which are both functional and aesthetically pleasing.

2. Description of the Prior Art

The prefabricated inner roof lining as currently used in motor vehicles in a work-saving manner has an independent, dimensional, stable component portion and offers many additional possibilities of use that were heretofore not recognized and that remained inaccessible for the web of material that was utilized previously in a time-consuming fashion and that only have the job of terminating the interior of the motor vehicle in the upward direction. Such a prefabricated inner roof lining is thereby composed of essentially the same materials as the other inner lining parts and is also manufactured according to the same, known manufacturing methods.

SUMMARY OF THE INVENTION

The object of the present invention is to further develop the known prefabricated inner roof linings of motor vehicles in such a fashion that it becomes available for a multitude of new possibilities of use.

The above object is achieved, according to the present invention, in that the prefabricated inner roof lining of the type constructed in accordance with the present invention comprises interconnects, conductive layers or conductive networks in its surface on its side facing away from the vehicle interior for the purpose of supplying electrical energy. Such a design of the prefabricated inner roof lining has many-sided advantages in comparison to the methods heretofore employed wherein individual cables or cable trees were laid between the prefabricated inner roof lining into the chassis. The construction, according to the present invention, of the prefabricated inner roof lining makes a current-carrying network available that is largely surface-covering and that can be tapped at all locations.

According to a particular embodiment of the invention, two interconnects, conductive layers or conductive networks are provided, these being separated from one another by an electrically insulating layer and being charged with voltage or, respectively, ground. In this manner, the two interconnects, conductive layers or conductive networks separated by an insulating layer serve as the two poles needed for supplying power.

According to another feature of the invention, the power requirement locations can be provided such that they are easily accessible from the interior of the vehicle. To this end, it is adequate to provide bores in the prefabricated inner roof lining at the location for power demand, as a result whereof the conductor elements or, respectively, the two poles needed for taking power off that are laid therein become directly accessible. Such a power demand location can be again closed without problems at a later time, as needed, and/or can be placed at different locations in the prefabricated inner roof lining.

It is thereby particularly advantageous that the power demand locations are composed of plug-type connectors or of other easily separable connections. These can be installed easily and without problems and removed, in turn, as needed.

According to another feature of the invention, additional apparatus for generating heat and/or cold may be connected to the power demand locations. For example, this can involve heat radiators or ventilators in order to potentially provide the interior of the vehicle with climate control in addition to devices already existing.

It is particularly advantageous and within the framework of the present invention when the prefabricated inner roof lining comprises incandescent lamps, fluorescent tubes and/or, at least in segments thereof, luminescent foils for illuminating the interior of the vehicle. As a result of the surface-covering power supply in the prefabricated inner roof lining, these can be installed without problems at arbitrary locations. It is a particular application of luminescent layers that leads to completely new applications of illumination elements in the interior of a vehicle. For example, specific function areas that shall be set forth in greater detail below can be identified with the corresponding layers. The large-area application of layers that fluoresce after the application of electrical energy can also be particularly meaningful from aesthetic point of view.

According to another feature of the invention, the interior roof lining can be constructed to comprise connecting locations or outlets for audio and/or video transmission. This can involve outlets for headsets, loudspeakers, picture screens, outlets that make it possible to listen to conversations received via mobile telephones or the like. All possibilities that are based on the transmission of electrical energy are fundamentally included here.

Also according to the invention, the interconnects, conductive layers or conductive networks laid in the prefabricated inner roof lining may serve as an antenna for a car radio, car video, car telephone or the like. Due to the surface-like character of such antenna, considerably improved reception quality can be achieved compared to the traditional rod antenna. Finally, a prefabricated interior roof lining constructed in accordance with the present invention may comprise at least one device for emitting ultraviolet radiation with an intensity permitted for a commercially-available sunlamp. The interconnects, conductive layers or conductive networks allow the easy installation of a type of tanning studio in the interior of the vehicle, even subsequently, this being of particular interest when it is considered that a person must currently often spend a considerable part of his leisure time in a vehicle.

A further additional feature of use is use of the roof lining, either alone or in combination with the embodiments set forth above and results when the prefabricated inner roof lining comprises a magnetic or magnetizable foil in its surface and/or at its side facing away from the vehicle interior in order to attach maps, parts thereof or other pictorial or printed matter with the assistance of corresponding magnetic stickers. Either permanent magnetic layers or layers that are magnetizable with the above-described electrically-conductive paths, layers or networks, can thereby be employed. The provision of such of possibility can be of great use, particularly for short-term and temporary storage of maps or similar orientation material, particularly since there are hardly any easily-employable deposits surfaces for such articles in the interior of a vehicle.

The invention also proposes that the prefabricated inner roof lining comprise pockets, folds, incisions and/or flap elements for the accommodation of maps, reading material, writing material or cosmetic utensils, audio cassettes and/or other parts where video and/or audio transmission is provided. It is thereby possible to spatially accommodate said articles such that they do not disturb the occupants, but are nonetheless easily accessible. It should be pointed out and emphasized in this context that it is particularly the aforementioned head sets or telephone sets that can be accommodated at locations suitable therefore, mainly, in the edge region of the prefabricated inner roof lining.

A further virtual plethora of possibilities of use results where the structural format of the prefabricated inner roof lining is a double-walled construction. A prefabricated inner roof lining that is not constructed as a single surface, but as a hollow form creates an additional useful space above the vehicle interior. The cavity resulting from the double-walled structural format can therefore be used for receiving liquids, such as, for example, fresh water, and/or air and agents for large-area heating and climate control of the vehicle interior. Given extremely-high outside temperatures, such an agent in the roof region of the motor vehicle can assume the important job of cooling. At extremely low outside temperatures, by contrast, it is possible to employ an agent located in the cavity of the prefabricated inner roof lining for heat transmission and distribution in the vehicle interior. Simultaneously, the cavity filled both with air and liquid serve the purpose of insulating the vehicle interior from the outside temperatures prevailing at the vehicle body roof.

According to the invention, the cavity arising due to the double-walled structural format can also serve as a storage space for articles, particularly travel accoutrements. A few possibilities compared to those already set forth above in the case of a additionally provided pockets, folds and/or flap elements are conceivable here. Finally, according to the invention, given a double-walled structural format of the prefabricated inner roof lining, inserts in the form of steel bands, wire grids, various foams and the like are integrated in the material structure of the surface facing toward the vehicle interior for higher loads per unit area given bearing jobs such as, for example, when the cavity is filled with liquids. Such reinforcements can be individually adapted, dependent on the height of the load per unit area to be anticipated. Finally, according to the invention, at least one portion of the lower surface of the double-walled structural format may be lowerable. In particular, the lowerable portion can serve as a table top in the vehicle interior. By being integrated in the prefabricated inner roof lining, it can be accommodated in an especially space-saving manner without disturbing the occupants when it is not required. All conceivable mechanisms known from the prior art for such purposes can be utilized for lowering and holding the lowerable portion.

As is likewise already the case in known prefabricated inner roof linings, the prefabricated inner roof lining according to the present invention can also be designed in an aesthetically appealing manner, whether the material or chromatic effects or, as proposed by the present invention, by being lined with wood veneer. That side facing toward the vehicle interior can thereby also be additionally specially structured, i.e. profiled, folded, corrugated or coined. In addition, for example, the edges can also be appropriately shaped in order to achieved a special decorative effect. Finally, grip parts or operating parts as well as dividing lines an bounding lines executed with precious metals can serve for further decoration of the prefabricated inner roof lining.

One structure proposed by the present invention in addition to the foregoing is that the surface facing toward the vehicle interior that is aesthetically designed is fashioned as a thin, removable layer that is interchangeable or that is drawn over the surface in the fashion of a window shade. By changing the appearance of the inner shell of the prefabricated inner roof lining, the possibility results in designing and modifying the appearance and, therefore, the character of the vehicle interior as one wishes.

BRIEF DESCRIPTION OF THE DRAWING

Other objects, features and advantages of the invention, its organization, construction and operation will be best understood from the following detailed description, taken in conjunction with the accompanying drawing, on which:

FIG. 3 is a perspective fragmentary view of an embodiment of a conductive grid having conductors extending at right angles with respect to one another;

FIG. 4 is an exploded perspective view of the sandwich structure of another embodiment of the invention using conductive networks;

FIG. 5 is a fragmentary sectional view of an embodiment of a roof liner constructed in accordance with the present invention and with a fitted current drain socket and, alternatively, a plug connection, and an air conditioning device;

FIGS. 6a-6d respectively illustrate plug-in devices including an incandescent lamp, a fluorescent lamp, a planar area lighting device and an ultraviolet lamp, with a respective current drain socket of the type illustrated in FIG. 5.

DESCRIPTION OF THE PREFERRED EMBODIMENTS

Figure 1:
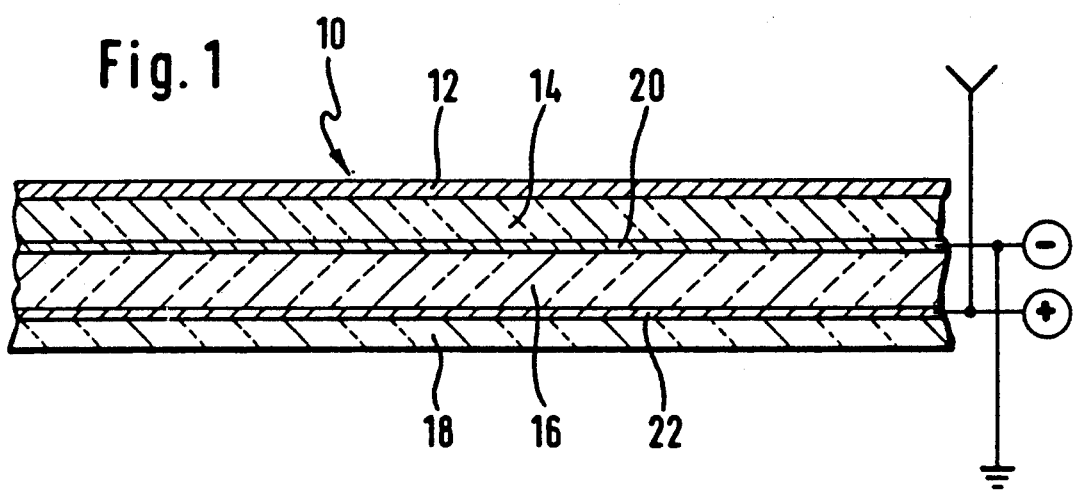
FIG. 1 is a fragmentary sectional view through a roof line lining constructed in accordance with an embodiment of the invention.

Referring to FIG. 1 a sandwich structure 10 is illustrated of a roof lining or canopy constructed in accordance with the present invention and which is fixed to the interior of a car roof plate 12. The sandwich structure 10 comprises a total of three insulating layers 14, 16 and 18, in which are embedded, in a sandwich-like manner, two conductive layers 20, 22. For example, the lower conductive layer 22 can be connected to the positive pole (+) of an electric power supply, while the upper conductive layer 20 can be correspondingly connected to a negative pole (−) of an electric power supply. It is alternatively possible to use both conductive layers as an antenna.

Figure 2:
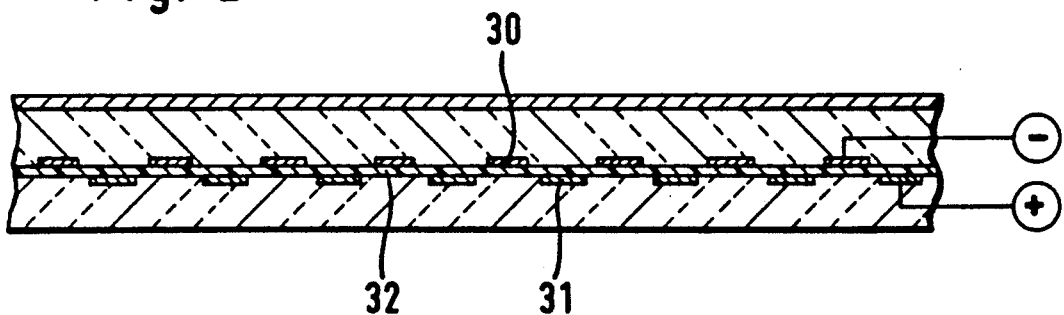
FIG. 2 is a fragmentary sectional view through a roof lining constructed in accordance with another embodiment of the invention showing oppositely-displaced conductors extending in the same direction.

FIG. 2 illustrates an alternative embodiment of a roof liner constructed in accordance with the invention in which conductor tracks 30 and 31 extend in the same direction (either in the transverse direction or longitudinal direction of the roof liner). The conductors 30 and 31 are arranged on both sides of a support plate which is, in turn, embedded in a sandwich structure insulated to either side. Once again, the upper conductors 30 can be connected to the negative pole (−) and the lower conductors 31 to the positive pole (+) of an electric power supply.

FIG. 3 illustrates an embodiment of the electric conductors for a roof liner constructed in accordance with the present invention in which the conductors do not extend in the same direction, but are at right angles with respect to one another forming a conductor grid or conductor network on either side of an insulating support plate.

FIG. 4 illustrates, in an exploded view, the sandwich structure of another embodiment of the roof liner constructed in accordance with the present invention. As in FIG. 1, there are three insulating layers 40, 42 and 44, the lower insulating layer 40 simultaneously constituting the inner cladding of the roof lining, while the upper layer 44 provides insulation against the car roof (plate 12 in FIG. 1). Conductor networks 46 and 48 (as in FIG. 3) are arranged in a sandwich-like manner between the layers 40-44 and, in accordance with the aforementioned embodiments, can again be connected to an electric power supply.

FIG. 5 illustrates the possibility provided through the inventive sandwich structure of the roof liner of insulating an electrically-conductive layers of having access to electrical power at any random point of the roof lining. For example, on the left-hand side a current drain socket 50 is illustrated as having an annular electric contact 52, which is in contact with a lower conductive layer 53, and an upper contact 54, which penetrates an upper conductive layer 55. A corresponding complementary plug 60 or equipment directly installed on the roof lining, such as an air conditioning device 70 as shown on the right-hand side of the drawing may be connected to such a current drain socket 50.

FIGS. 6l-6d illustrate different types of lighting elements or lamps, which can be connected via a corresponding plug to the current drain socket 50 or directly to current drain devices fitted to the rear thereof with the corresponding conductor layers in the roof lining. FIG. 6a illustrates an incandescent lamp 60 having a corresponding socket 82, FIG. 6b illustrates a fluorescent lamp 90 with a slightly differently-constructed socket 92, which also has contacts 94, 96 for the corresponding conductive layers. FIG. 6c illustrates a planar illuminating device 100 connected to a corresponding power drain socket, which permits an area illumination of the vehicle interior. FInally, FIG. 6d illustrates an ultraviolet lamp 110 with which it is possible to bring about a type of solarium setting within the vehicle.

Figure 7:
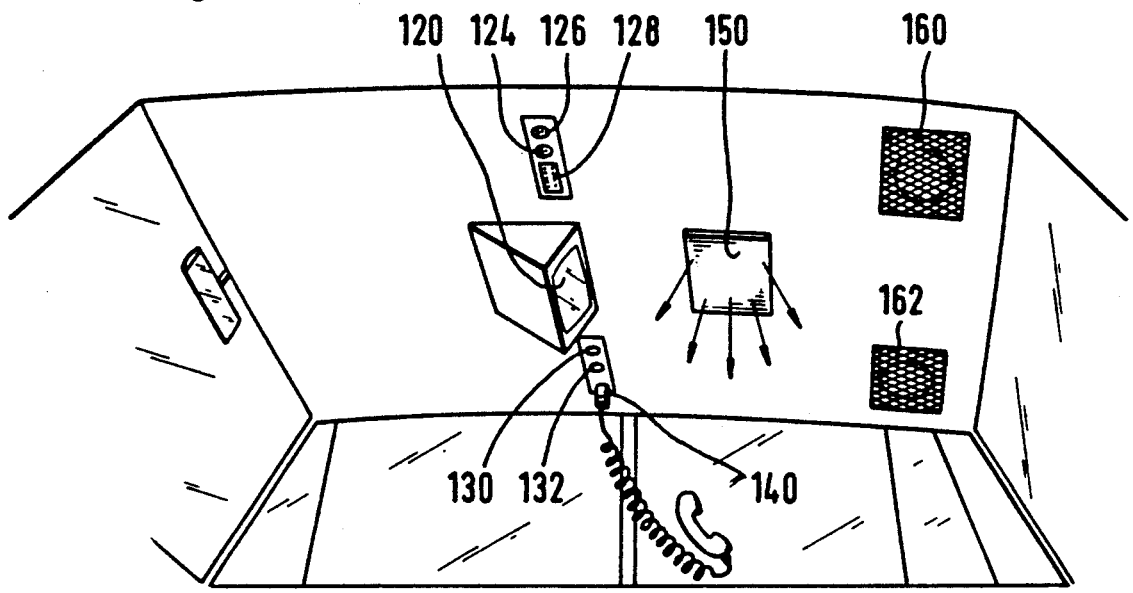
FIG. 7 is a perspective view from below of a roof lining constructed in accordance with the present invention and having a plurality of electrical units installed thereat.

FIG. 7 is a perspective view from below of a roof lining constructed in accordance with the present invention in which are fitted various electrical devices by way of corresponding current drain sockets. Shown are a monitor 120, loudspeaker connections 124, 126, a video connection 128, current drain receptacles 130, 132 for receiving corresponding plug connections, such as a car telephone connection 140, a planar illuminating device 150 for illuminating the rear portion of the passenger compartment and two speakers 160, 162. Further electrical units can be additionally provided at any random time and location as a result of the sandwich structure of the roof liner constructed in accordance with the present invention.

Figure 8:
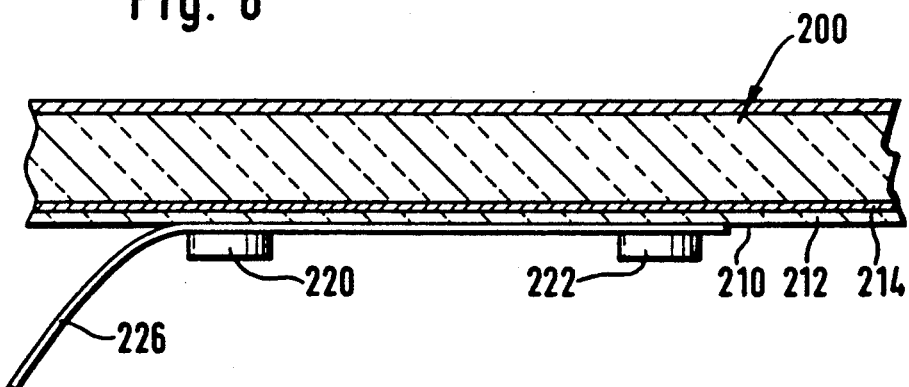
FIG. 8 is a fragmentary sectional view of an embodiment of a roof lining constructed in accordance with the present invention and having a magnetizable layer.

FIG. 8 illustrates another embodiment of a roof liner which illustrates another aspect of the invention. A magnetic layer 214 is fitted to the side 210 of the roof lining 200 facing the vehicle interior and is covered with a decorative layer 212. With the aid of magnets 220 and 222, different materials such as a card or a map 226 can be fixed to the roof lining. This provides the possibility of utilizing the roof lining as a further depositing or holding area in addition to those already available in the vehicle interior.

Figure 9:
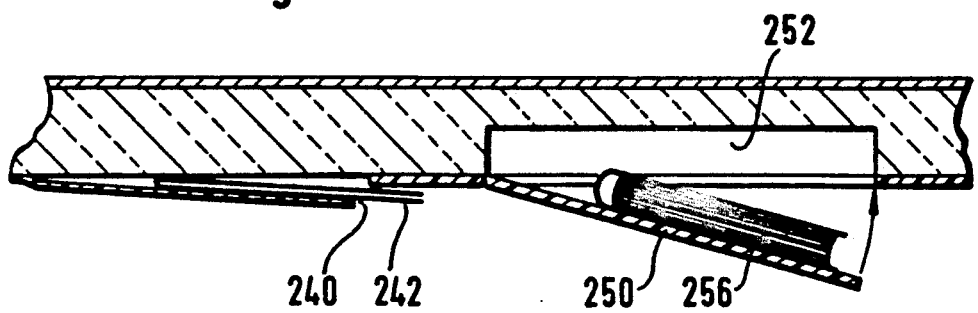
FIG. 9 is a fragmentary sectional view similar to that of FIG. 8 illustrating a recess and hinged covers.

Another possibility in this connection is revealed in FIG. 9 where pocket-like recesses 240 are provided for inserting thin materials, such as road maps 242 and hinged covers 250, which give access to a storage area 252 provided within the roof lining. Such a storage area can be used for example for holding thicker articles, such as a book 256.

FIGS. 10-13 illustrate further possibilities for the design and use of the cavity within the roof lining.

Figure 10:
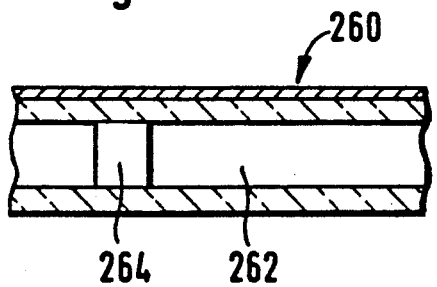
FIG. 10 is a fragmentary sectional view of an embodiment of a roof liner constructed in accordance with the present invention and provided with an integrated cavity.

FIG. 10 diagrammatically illustrates a cavity 262 in a roof lining 260 spacers 264 being provided at regular intervals for reinforcing the overall structure.

Figure 11:
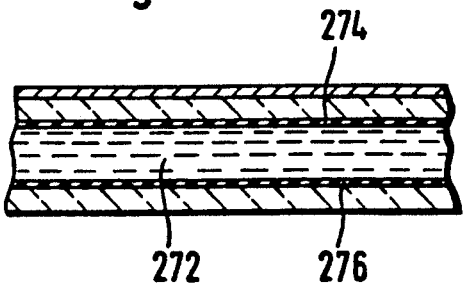
FIG. 11 is a fragmentary sectional view similar to that of FIG. 10 in which the roof liner includes an integrated cavity which is a liquid-filled cavity.

As shown in FIG. 11, the cavity can be used for containing liquid 272 and, in this case, advantageously sealing films 274, 276 are provided on either side of the cavity. In this case the cavity can simultaneously serve as a liquid container for, for example, a fresh water supply or as an insulation of the vehicle interior against outside temperatures of the automobile body roof.

Figure 12:
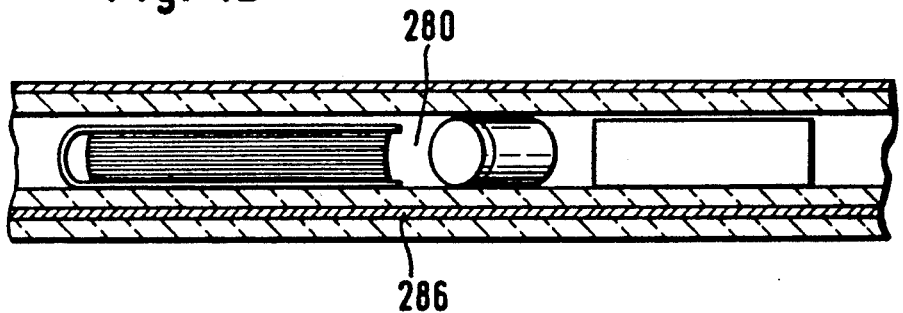
FIG. 12 is a fragmentary sectional view similar to that of FIGS. 10 and 11 illustrating the use of an internal cavity as a storage area.

FIG. 12 illustrates the use of a large-area storage zone 280 in the interior of the roof lining for storing various articles. Access to this storage zone can be provided by hinged covers, such as are shown, for example, in FIG. 9. There are inserts in the roof lining side facing the vehicle interior, such as, for example, steel bands 286 for the purpose of reinforcing the structure.

Figure 13A:
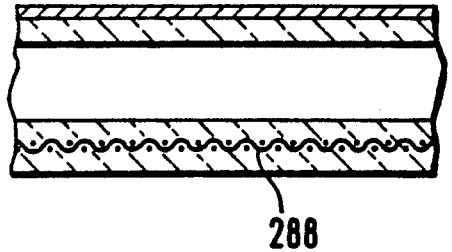
FIGS. 13a and 13b are fragmentary sectional view illustrating different possibilities of reinforcement of the roof lining according to the present invention.
Figure 13B:
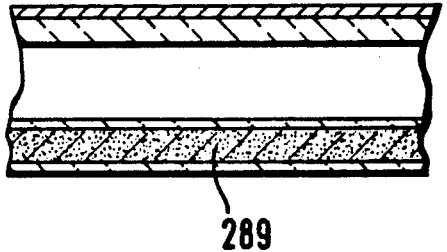

FIG. 13 illustrates other reinforcing possibilities, in particular FIG. 13a illustrating a wire grading 288 and FIG. 13b illustrating a rigid foam material 289.

Figure 14:
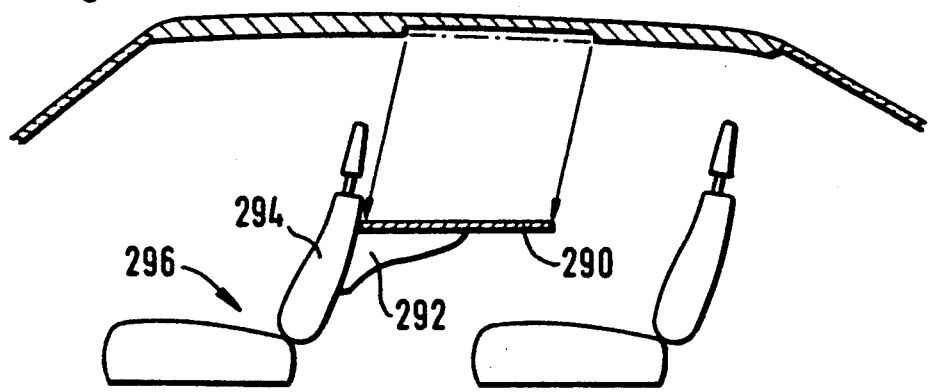
FIG. 14 is a schematic representation, shown in longitudinal cross section, of an automobile compartment having a roof liner constructed in accordance with the present invention and including a section which is lowerable for use as a table.

Another possibility for illustrating the roof liner of the present invention is shown in FIG. 14. In this embodiment, a surface 290 is provided which can be lowered as a table and which can be lowered and secured with the aid of a rod or cable structure (not shown). A bracket 292 on the backrest 294 of the front seat 296 can be provided as an additional support.

Figure 15A:
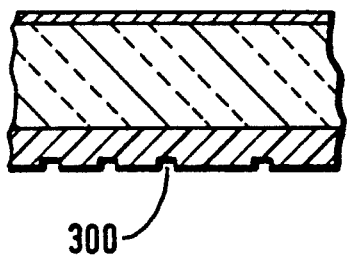
FIGS. 15a-15c are fragmentary sectional views of roof liners respectively illustrating different decorative interior surfaces.
Figure 15B:
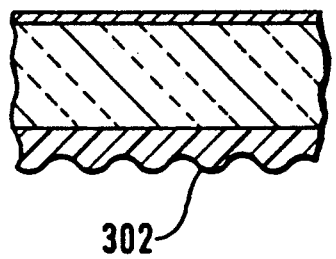
Figure 15C:
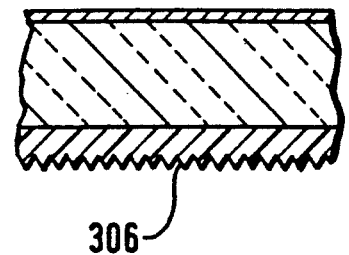
Figure 16:
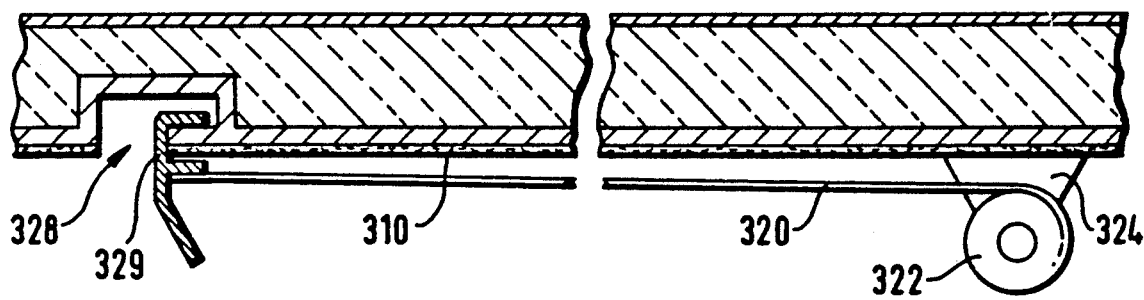
FIG. 16 is a fragmentary sectional view of a roof liner constructed in accordance with the present invention which is provided with a window shade type of covering for the interior of an automobile.
Figure 17:
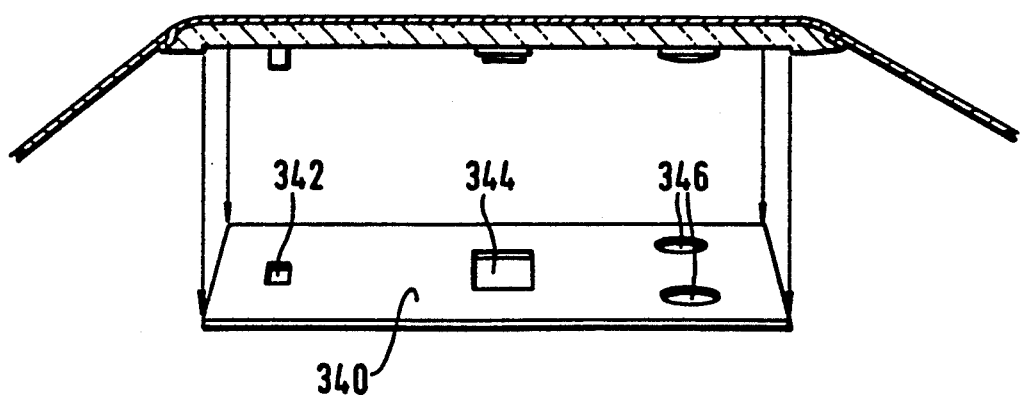
FIG. 17 is a schematic representation, shown in longitudinal section, of the roof area of a vehicle in which the roof liner is provided with a removable, thin inner layer adapted for receiving electrical devices therethrough.

FIGS. 15-17 illustrate various possibilities for the aesthetic design of the roof lining surface facing the interior of the vehicle.

FIGS. 15a-15a illustrate different types of relief forms with grooves 300 undulations 302 and corrugations 306, respectively.

FIG. 16 illustrates a wood veneer 310 on the interior of the roof liner which can be concealed or revealed by a corresponding, esthetically designed window shade 320 which is fixed by way of a reel 322 and brackets 324 to the roof liner. On the roof liner side facing the reel 322 is provided a corresponding mechanism 328 in which a corresponding end piece 329 of the reel is hooked and held.

FIG. 17 illustrates the possibility of completely removing a thin inner layer 340 from the roof lining and to replace the same by another, different esthetically-designed layer. In this case, appropriate openings 342, 344 and 346 are provided for already-fitted electrical units mounted on the roof liner.

A prefabricated inner roof lining may be constructed with a combination of any or all of the above features using ordinary manufacturing processes.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A prefabricated roof lining for motor vehicles, comprising:
   a layer structure including a first surface for facing the interior of the vehicle and a second surface facing opposite said first surface;
   a plurality of electrical conductors carried by said layer structure spaced from said first surface and adapted for connection to receive electrical energy; and
   means for extending through said layer structure and to connect to said electrical conductors to tap electrical energy therefrom at any location of the roof lining.

2. The prefabricated inner roof lining of claim 1, wherein:
   said plurality of electrical conductors comprises two electrical conductors; and
   an electrically-insulating layer is carried on said second surface and separates said two electrical conductors.

3. The prefabricated roof lining of claim 1, wherein: said means for extending through said layer structure comprises plug-type connector means.

4. The prefabricated inner roof lining of claim 3, and further comprising:
   temperature control means connected to said electrical conductors by said plug-type connection means.

5. The prefabricated inner roof lining of claim 1, wherein:
   said means extending through said layer structure comprises illuminating means.

6. The prefabricated inner roof lining of claim 5, wherein:
   said illuminating means comprises incandescent lamps.

7. The prefabricated inner roof lining claim 5, wherein:
   said illuminating means comprises at least one fluorescent tube.

8. The prefabricated inner roof lining of claim 5, wherein:
   said illuminating means comprises luminescent layers.

9. The prefabricated inner roof lining of claim 1, wherein:
   said means extending through said layer structure comprises at least one audio outlet.

10. The prefabricated inner roof lining of claim 1, wherein:
    said means extending through said layer structure comprises a video outlet.

11. The prefabricated inner roof lining of claim 1, wherein:
    said means extending through said layer structure comprises at least one built-in loudspeaker.

12. The prefabricated inner roof lining of claim 1, wherein:
    said means extending through said layer structure comprises at least one picture screen.

13. The prefabricated inner roof lining of claim 1, wherein:
    said means extending through said layer structure comprises at least one mobile telephone outlet.

14. The prefabricated inner roof lining of claim 1, and further comprising:
    an antenna including said plurality of electrical conductors.

15. The prefabricated inner roof lining of claim 1, wherein:
    means extending through said layer structure comprises at least one ultraviolet radiation emitter.

16. The prefabricated inner roof lining of claim 1, and further comprising:
    magnetic means in said layer structure spaced from said first surface for attaching maps and the like thereto in combination with and with the assistance of cooperable removable magnetic stickers.

17. The prefabricated inner roof lining of claim 1, and further comprising:
    storage means in said layer structure for receiving and storing an article.

18. The prefabricated inner roof lining of claim 17, wherein:
    said storage means comprises pockets.

19. The prefabricated inner roof lining of claim 17, wherein:
    said storage means comprises folds in said layer structure.

20. The prefabricated inner roof lining of claim 18, wherein:
said storage means comprises incisions through said first surface.

21. The prefabricated inner roof lining of claim 17, wherein:
said storage means comprises flaps attached to said layer structure.

22. The prefabricated roof lining of claim 1, wherein:
said layer structure comprises at least two spaced walls forming a chamber therebetween.

23. The prefabricated inner roof lining of claim 22, and further comprising:
a liquid filling said chamber for altering the heat transmission through said layer structure.

24. The prefabricated inner roof lining of claim 22, and further comprising:
air and liquid filling said chamber to alter the heat transmission through said layer structure.

25. The prefabricated inner roof lining of claim 1, and further comprisinq:
reinforcement means in said layer structure.

26. The prefabricated inner roof lining of claim 25, wherein:
said reinforcement means comprises steel bands.

27. The prefabricated inner roof lining of claim 25, wherein:
said reinforcement means comprises wire grids.

28. The prefabricated inner roof lining of claim 25, wherein:
said reinforcement means comprises rigid foam material.

29. The prefabricated inner roof lining of claim 1, wherein:
said layer structure comprises first and second wall, said first wall carrying said first surface for facing the interior of the vehicle; and
a portion of said first wall being separable and lowerable therefrom.

30. The prefabricated inner roof lining of claim 29, and further comprising:
means for supporting said portion as a table top in the vehicle interior.

31. The prefabricated inner roof lining of claim 22, wherein:
said layer structure comprises first and second walls, said first wall carrying said first surface for facing the interior of the vehicle, said first surface bearing a fanciful design.

32. The prefabricated inner roof lining of claim 22, wherein:
said layer structure comprises first and second walls, said first wall carrying said first surface for facing the interior of the vehicle; and
a wood veneer layer carried on said first surface.

33. The prefabricated inner roof lining of claim 22, wherein:
one of said walls includes said first surface, and said first surface comprises structured means formed thereon.

34. The prefabricated inner roof lining of claim 33, wherein:
said structured means includes a profiled surface.

35. The prefabricated inner roof lining of claim 33, wherein:
said structured means comprises a folded corrugated surface.

36. The prefabricated inner roof lining of claim 34, wherein:
said structured means includes a coined surface.

37. The prefabricated inner roof lining of claim 23, wherein:
said layer structure comprises first and second walls, said first wall carrying said first surface for facing the interior of the vehicle; and
a removable, interchangeable, decorative layer carried on said first surface.

38. The prefabricated inner roof lining of claim 1, and in combination therewith a window shade-type device including a shade mounted to be drawn over said first surface and means for latching said shade in its drawn condition.

* * * * *